(12) United States Patent
Caveza

(10) Patent No.: US 7,703,447 B2
(45) Date of Patent: Apr. 27, 2010

(54) ANIMAL FOOD DISPENSER

(75) Inventor: Martin Caveza, Redondo Beach, CA (US)

(73) Assignee: Doskocil Manufacturing Company, Inc., Arllington, TX (US)

( * ) Notice: Subject to any disclaimer, the term of this patent is extended or adjusted under 35 U.S.C. 154(b) by 741 days.

(21) Appl. No.: 11/486,764

(22) Filed: Jul. 13, 2006

(65) Prior Publication Data

US 2007/0056517 A1   Mar. 15, 2007

Related U.S. Application Data

(60) Provisional application No. 60/717,687, filed on Sep. 15, 2005.

(51) Int. Cl.
*F41B 7/00* (2006.01)
*A01K 1/10* (2006.01)

(52) U.S. Cl. .................. 124/16; 124/37; 119/51.01; 119/707

(58) Field of Classification Search ............... 124/16, 124/37, 44.7, 27, 41.4, 26, 38, 39; 119/51.01, 119/52.1, 57.91, 61.2, 707, 709–711; 446/225; 273/129 AP, 129 S; 221/24, 254; 222/236, 222/340, 341
See application file for complete search history.

(56) References Cited

U.S. PATENT DOCUMENTS

| | | | |
|---|---|---|---|
| 563,807 A | 7/1896 | Rudolph | |
| 2,814,285 A | 11/1957 | Yamauchi | |
| 3,159,308 A * | 12/1964 | Passavanti | 221/289 |
| 3,192,915 A | 7/1965 | Norris et al. | |
| 3,196,861 A | 7/1965 | Yano | |
| 3,297,325 A | 1/1967 | Lerner et al. | |
| 3,370,746 A | 2/1968 | Haas | |
| 4,227,508 A | 10/1980 | D'Andrade | |
| 4,311,251 A * | 1/1982 | Sternberg | 221/24 |
| 4,474,308 A * | 10/1984 | Bergeron | 221/24 |
| 5,063,905 A * | 11/1991 | Farrell | 124/72 |
| 5,405,011 A * | 4/1995 | Haber et al. | 206/531 |
| 6,244,463 B1 | 6/2001 | Richards et al. | |
| 6,702,149 B2 | 3/2004 | Brown et al. | |
| 6,722,317 B2 | 4/2004 | O'Rourke | |
| 7,237,545 B2 * | 7/2007 | Masse | 124/75 |
| 2004/0237954 A1 * | 12/2004 | Styles et al. | 124/77 |
| 2007/0095293 A1 * | 5/2007 | Moulton | 119/51.01 |

* cited by examiner

*Primary Examiner*—Kimberly S Smith
*Assistant Examiner*—Joshua J Michener
(74) *Attorney, Agent, or Firm*—Dorsey & Whitney LLP

(57) ABSTRACT

A dispenser for launching morsels of animal food one at a time. The dispenser includes a grip portion, a hopper for retaining a supply of morsels of animal food, and a launching chamber. A propelling mechanism, activated by a trigger mechanism associated with the grip portion, launches a morsel of food out of the launching chamber. According to one embodiment, the propelling mechanism is a plunger and at least one spring, wherein the plunger is adjustable between a loading position wherein a top portion of the plunger is substantially withdrawn from the launching chamber to permit a morsel of food to pass into the launching chamber, and a ready position wherein the plunger extends at least partially into the launching chamber to prevent additional morsels of food from passing through the inlet into the launching chamber.

10 Claims, 6 Drawing Sheets

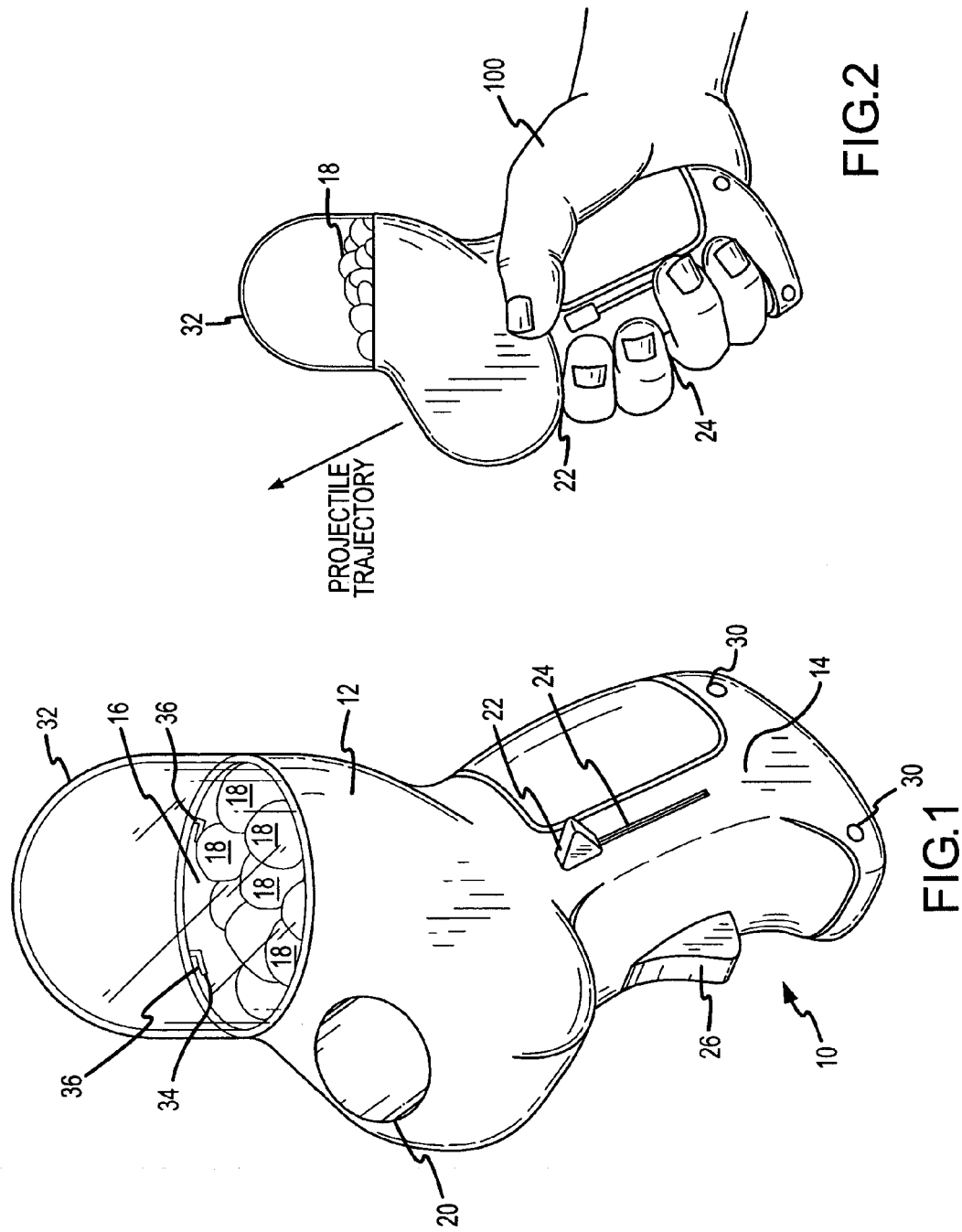

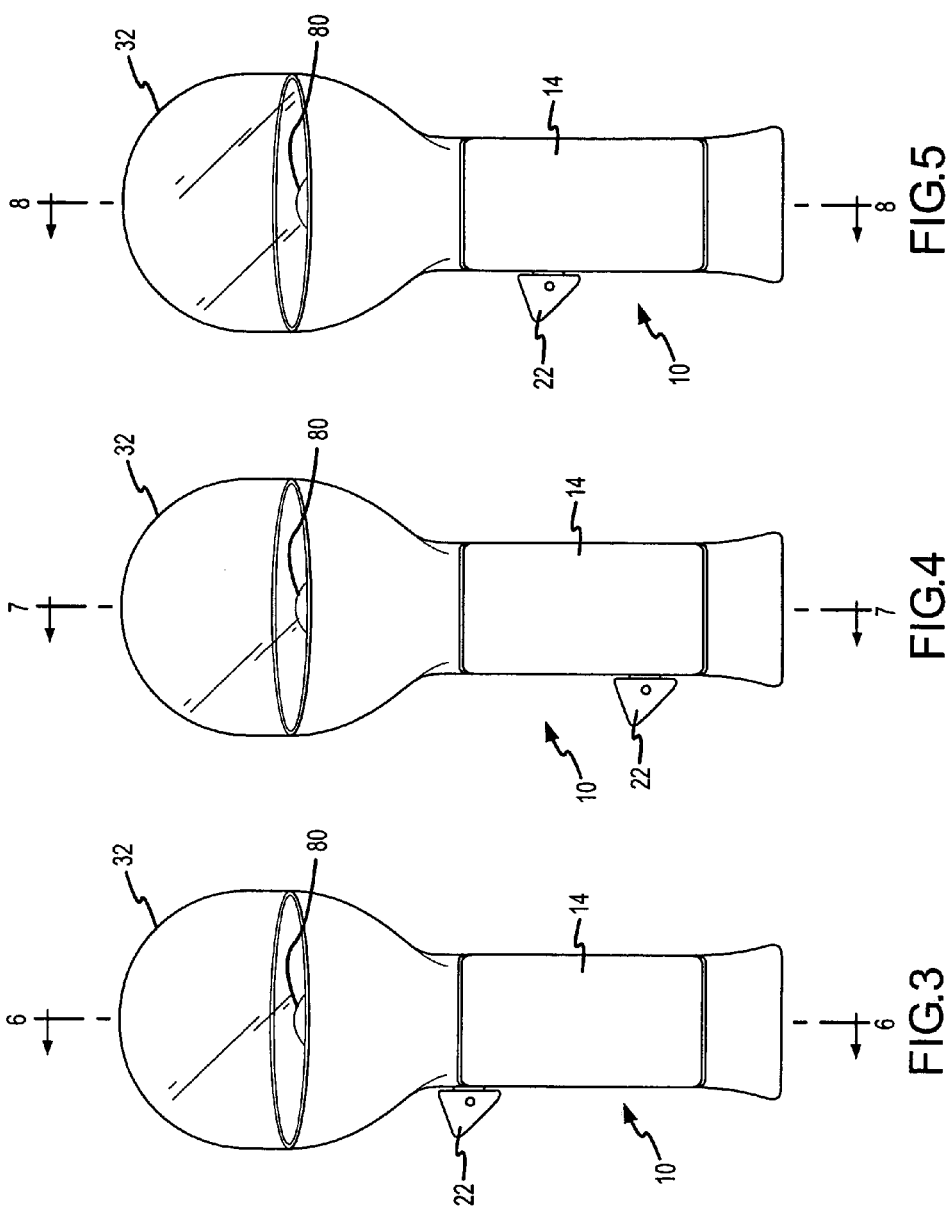

ANIMAL FOOD DISPENSER

CROSS-REFERENCE TO RELATED APPLICATIONS

The present application claims the benefit under 35 U.S.C. §119 (e) to U.S. Provisional Patent Application No. 60/717,687, filed Sep. 15, 2005 and entitled "Animal Food Dispenser", the disclosure of which is hereby incorporated herein in its entirety.

BACKGROUND OF THE INVENTION

1. Technical Field

This invention pertains generally to animal food dispensers and more particularly to a device for launching morsels of food to pets.

2. Background

Pet owners commonly desire to provide treats for their pets, such as dogs, cats, and the like in the form of small morsels of food. Commonly, these small morsels of food are in the form of kibble or other generally regularly sized dry portions of food. It is desirable to be able to dispense these morsels of food to the pet one at a time. Oftentimes, pet treats can be messy to handle, and it is therefore desirable for the person providing treats to a pet to avoid unnecessary handling of the treats. Additionally, it can be messy to carry around a supply of several pet treats.

Accordingly, there is a need for a pet treat dispenser that will dispense treats one at a time, will alleviate the need for a user to individually handle each treat as it is dispensed, and that will dispense the treats in an entertaining and satisfying manner for both the pet and owner.

BRIEF SUMMARY OF THE INVENTION

One embodiment of the present invention takes the form of a pet treat shooter. The pet treat shooter has a body that includes a handle, a hopper for holding a supply of pet treats, and a launching chamber. The hopper is disposed to selectively supply pet treats one at a time to the launching chamber. A propelling mechanism is provided within the body to propel a single pet treat out of the launching chamber and away from the body upon activation by a trigger mechanism associated with the handle.

Another embodiment of the present invention takes the form of an animal treat launcher for launching a morsel of food to a pet with a body having a hopper for retaining morsels of food. A biased plunger is slidably mounted within the body. The biased plunger has a loading position wherein the plunger is withdrawn away from the hopper to permit loading of a first morsel of food onto the plunger. The biased plunger also has a ready position wherein the biased plunger is moved a distance from the loading position to partially block additional morsels of food from exiting the hopper. A trigger mechanism is provided to activate the biased plunger away from the ready position and thereby launch the first morsel of food out of the body.

According to another embodiment, the invention is a method of dispensing morsels of food to an animal by providing an animal food dispenser having propelling mechanism and a hopper for retaining a plurality of morsels of animal food. the propelling mechanism is adjusted to a loading position, wherein a single morsel of animal food is loaded onto the propelling mechanism from the hopper. The propelling mechanism is allowed to self-adjust from the loading position to a ready position. The propelling mechanism is disengaged from the ready position to launch the single morsel of animal food out of the animal food dispenser.

Additional features and advantages of the present invention will become apparent upon reading the entirety of this disclosure.

BRIEF DESCRIPTION OF THE FIGURES

FIG. 1 depicts a perspective view of an animal treat launcher according to one embodiment of the present invention;

FIG. 2 depicts a side view of the animal treat launcher of FIG. 1 in the grip of a user;

FIG. 3 depicts a rear elevation view of the animal treat launcher of FIG. 1, in a unloaded uncocked configuration;

FIG. 4 depicts a rear elevation view of the animal treat launcher of FIG. 1, in a loading configuration;

FIG. 5 depicts a rear elevation view of the animal treat launcher of FIG. 1, in a ready cocked configuration;

DETAILED DESCRIPTION

Figure 6:
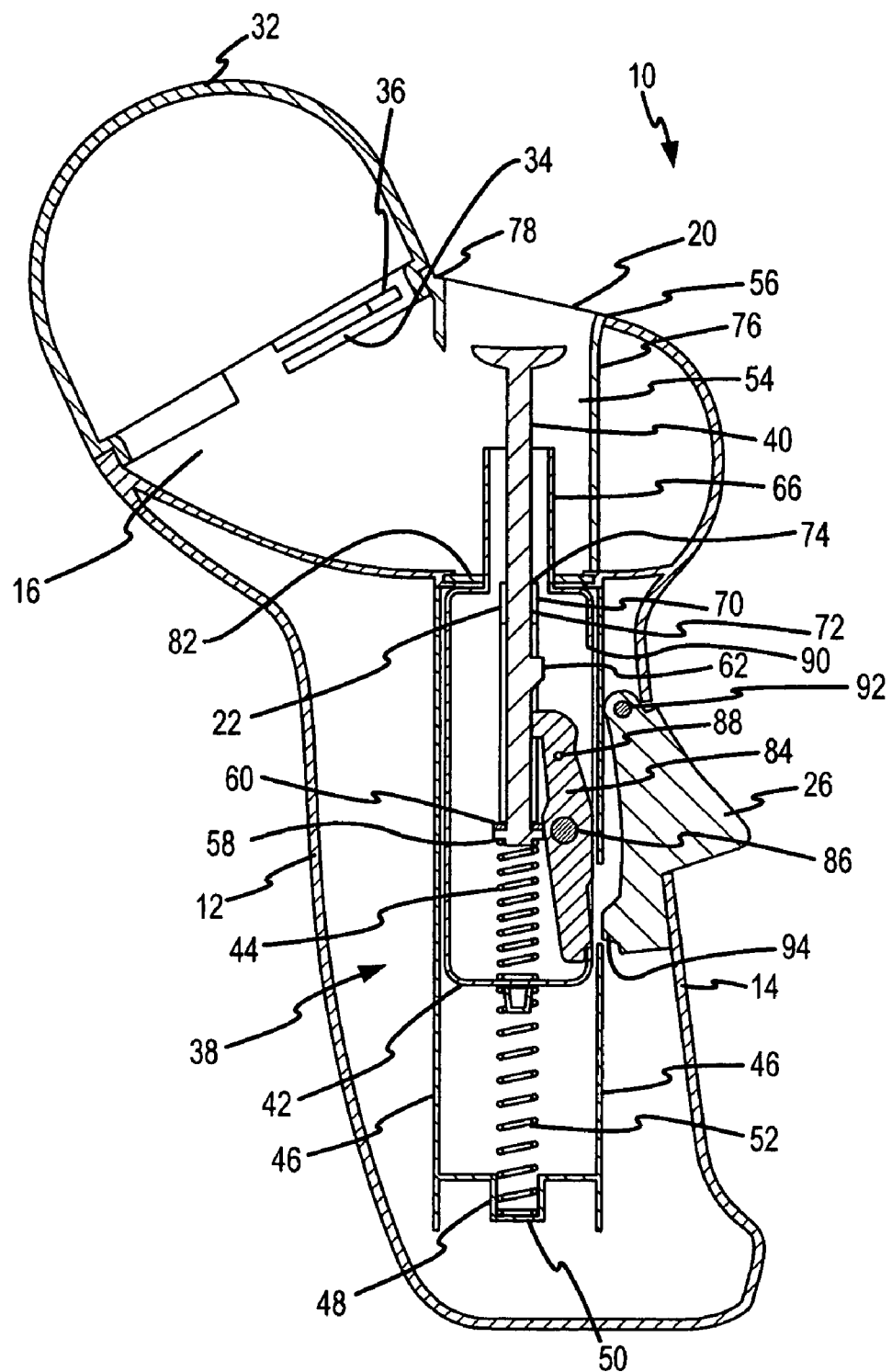
FIG. 6 is a cross-sectional view of the animal treat launcher of FIG. 1, taken along line 6-6 of FIG. 3.

One embodiment of the present invention takes the form of a dispenser for animal food. The dispenser propels small morsels of food in the form of kibble, or the like, one morsel at a time. The dispenser includes a body portion having a handle or grip portion that a user may grab. A hopper is provided to hold a supply of morsels of food. A propelling mechanism, such as a plunger, is adjusted to a loading position to permit gravity feed of a morsel of food from the hopper to a launching chamber. The plunger is then adjusted, or allowed to self adjust, into a ready position that prevents additional morsels of food from fouling the launching chamber. A triggering mechanism is utilized to activate the propelling mechanism and launch a single morsel of food as a projectile out of the dispenser, preferably in a generally upward initial arc.

FIG. 1 depicts an animal food dispenser 10 according to one embodiment of the present invention. A body 12 in the form of a housing or case includes a grip portion 14. A hopper 16 is provided within the body 12 for retaining a supply of animal food morsels 18. A hopper lid 32 may be attached to the body 12 to protect and retain the animal food morsels within the hopper 16. An outlet 20 is provided, through which the food morsels 18 are expelled out of the body to a pet, or other animal. A cocking lever 22 is provided within a slot 24 along a side of the grip portion 14 to load a food morsel 18 into a ready position before being launched. A trigger 24 is located along a front surface of the grip portion 14 for activating a launch of a food morsel 18 after the locking lever has been adjusted into the ready position.

The body 12 may be formed from any suitable relatively hard durable material. According to the embodiment shown, the body 12 may be formed by two injection-molded plastic body halves that are joined together to form the generally hollow body 12. In the embodiment shown in FIG. 1, screws 30 are used to fasten the two body halves together. The body halves may be joined together by any of a variety of other mechanisms, such as other threaded fasteners, bolts, adhesives, welding, or by snapping together. The overall shape of the body 12 is not critical to functioning of the animal food dispenser 10. However, it is preferred that the outlet 20 be disposed to face generally upwardly when a user grips the grip portion 14 in a natural manner such that the food morsels 18 will be launched along an arc that is initially upward. Furthermore, the grip portion 14 is preferably ergonomically shaped for comfortable holding and use.

The hopper 16 is formed within a hollow portion of the body 12. The hopper 16 should be located at an upper portion of the body 12 when in use as shown in FIG. 2, so that gravity may be used to feed the food morsels 18 out of the hopper 16 into a launch position. As seen in FIG. 6, the hopper 16 is an enclosed portion with the body 12 that will retain several food morsels 18. The food morsels 18 may be any relatively small food substance that might be provided as a treat to an animal. Preferably the food morsels 18 will be dry portions of food of relatively uniform size and having a generally constant cross-section such that no dimension is significantly larger than the other dimensions. The food morsels 18 should have sufficient integrity so that they will not fall apart upon being launched a short distance, typically on the order of one to five feet, or more in certain embodiments, by the dispenser 10. Kibble and mass-produced dry food pellets make ideal food morsels 18, however, other foodstuffs may be used without departing from the invention.

A hopper lid 32 is used to cover the hopper 16 to prevent the food morsels 18 from falling out of the hopper 16. The hopper lid 32 may be easily removed to permit additional food morsels 18 to be added and can be reattached to again seal the hopper 16 shut. In the embodiment shown, the hopper lid 32 has protrusions 36 (see FIGS. 6-8) that engage threads 34 formed along the top rim of the hopper 16. Accordingly, the hopper lid 32 may be attached to the body 12 by aligning the protrusions with an opening 36 in the threads 34 and rotating the hopper lid 32 to fully engage the protrusions with the threads 34. Those of skill in the art will be aware of numerous acceptable options for removably connecting the hopper lid 32 to the body 12. Preferably, though not required, the hopper lid 32 will be transparent so that a user can monitor how many food morsels 18 remain in the hopper 16 at any time without the need to remove the hopper lid 32.

As will be described in more detail below with respect to FIGS. 6-8, the cocking lever 22 is used to load and cock a propelling mechanism 38. FIGS. 3-5 show the progression of the cocking lever 22 during the loading and ready stages. FIG. 3 shows the cocking lever 22 in a raised position before a first food morsel 18 has been loaded (see also FIG. 6). FIG. 4 shows the cocking lever 22 in a fully depressed position loading position that is utilized to load a first food morsel 18 on to the propelling mechanism 38 (see also FIG. 7). FIG. 5 shows the cocking lever 22 retained in a ready position that is between the unloaded uncocked and loading positions of FIGS. 3 and 4 respectively. In the ready position, the propelling mechanism is cocked and ready to launch the first food morsel 18 upon activation by the trigger 26 (see also FIG. 8). After the propelling mechanism has been activated by the trigger 26, the cocking lever 22 returns to the position of FIG. 3. The process may be repeated for launching subsequent food morsels 18.

As noted above, FIG. 6 shows a cross-sectional view of the animal food dispenser 10 in an unloaded, uncocked configuration as would be the case immediately after launching a food morsel 18. The propelling mechanism 38 includes a plunger 40, carriage 42, plunger spring 44, and carriage spring 52. The plunger 40 has a lower portion that is received within carriage 42. The plunger spring 44 is provided between the bottom of the plunger 40 and a bottom floor of the carriage 42 to urge the plunger 40 upwardly and out of the carriage 42. The carriage 42 is slidable within rails 46 formed within the handle portion 14 of the dispenser 10. A bottom bracket 48 provided at one end of rails 46 includes a seat 50 for retaining the carriage spring 52. The carriage spring 52 presses between the bottom bracket 48 and a bottom portion of the carriage 42 to urge the carriage upwardly towards a launching chamber 54.

At its upper end, the plunger 40 is provided with a morsel support 56. The morsel support 56 should include a concave surface to support and cradle a food morsel 18. At its lower end the plunger 40 includes a shoulder 58. Catches 60 limit the upward travel of the plunger 40 by bearing against shoulder 58. Catches 60 may take the form of posts or bars molded into the carriage 42, or may be in the form of a journal bearing fixed within the carriage 42. Those of skill in the art will be aware of numerous acceptable mechanisms for limiting the upward travel of the plunger 40 relative to the carriage 42.

The plunger 40 is affixed to the cocking lever 22, such that movement of the cocking lever 22 within slot 24 causes corresponding movement of the plunger 40. Carriage 42 is also provided with a cocking lever slot 62 to allow for movement of the plunger 40 and cocking lever 22 relative to the carriage 42. The plunger is also provided with a catch 70 in the form of a protrusion along the side of the plunger 40 nearest to the trigger 26. Preferably the catch 70 has a tapered bottom surface 72, and a catching surface 74 that extends generally perpendicularly relative the plunger 40.

The carriage 42 in the embodiment shown has a generally rectangular body portion 64 with a cylindrical tube 66 provided at its upper end. The upward travel of the carriage 42 within the body 12 is limited by protrusions 68 formed in the body 12 that interfere with the body portion 64 of the carriage 42. The cylindrical tube 66 extends between the protrusions 68 into the launching chamber 54, when the carriage is in the upper unloaded uncocked position of FIG. 6. As noted above, the carriage 42 is urged into the unloaded uncocked position of FIG. 6 by the carriage spring 52 bearing between the bracket 48 and the carriage 42. The plunger 40 is journalled within the cylindrical tube 66 and is urged into the upward most unloaded uncocked position FIG. 6 by plunger spring 44 pressing between the shoulder 58 on the bottom of plunger 40 and the bottom of the carriage 42.

The launching chamber 54 is formed by a launching tube 76 that surrounds the upper portion of the plunger 40. The upper edge 78 of the launching tube 76 has a circular cross section that forms the outlet 20 through which a food morsel 18 is launched. The lower portion of the launching tube 76 includes an opening that provides an inlet 80 into the launching chamber 54. The launching tube 76 should closely surround the plunger 40, such that when the plunger is in the raised unloaded uncocked position of FIG. 6, food morsels 18 cannot significantly infiltrate and become lodged within the launching chamber 54. Additionally, the inlet 80 should be below the morsel support 56 in the unloaded uncocked position so that the food morsels 18 are retained within the hopper 16.

An O-ring 82 is provided at the interface between the launching chamber 54 and the grip portion 14 to prevent food morsels 18 and residue from food morsels 18 from falling into and fouling the grip portion 14 wherein the carriage slides.

A toggle lever 84 is pivotally mounted to the carriage 42 on post 86 proximate to the trigger 26. A cantilever spring (not shown) biases upper portion of the toggle lever 84 towards the plunger 40 and consequently biases the lower portion of the toggle lever 84 outward towards the trigger 26. The upper portion of the toggle lever includes a locking surface 87 that extends generally away from the toggle lever 84 towards the plunger 40. A passageway 88 may be provided in the upper portion of the toggle lever 84 for receiving the cantilever spring. A side opening 90 is provided in the carriage 42 so that the toggle lever is exposed to the trigger 26.

Trigger 26 is pivotally mounted to the handle portion 14 of the body 12 by pin 92. A projection 94 extends from the bottom portion of the trigger 26 towards the plunger 40. Preferably, as shown, the free end of the trigger 26 is retained within the body 12 by a lip or other protrusion.

Figure 7:
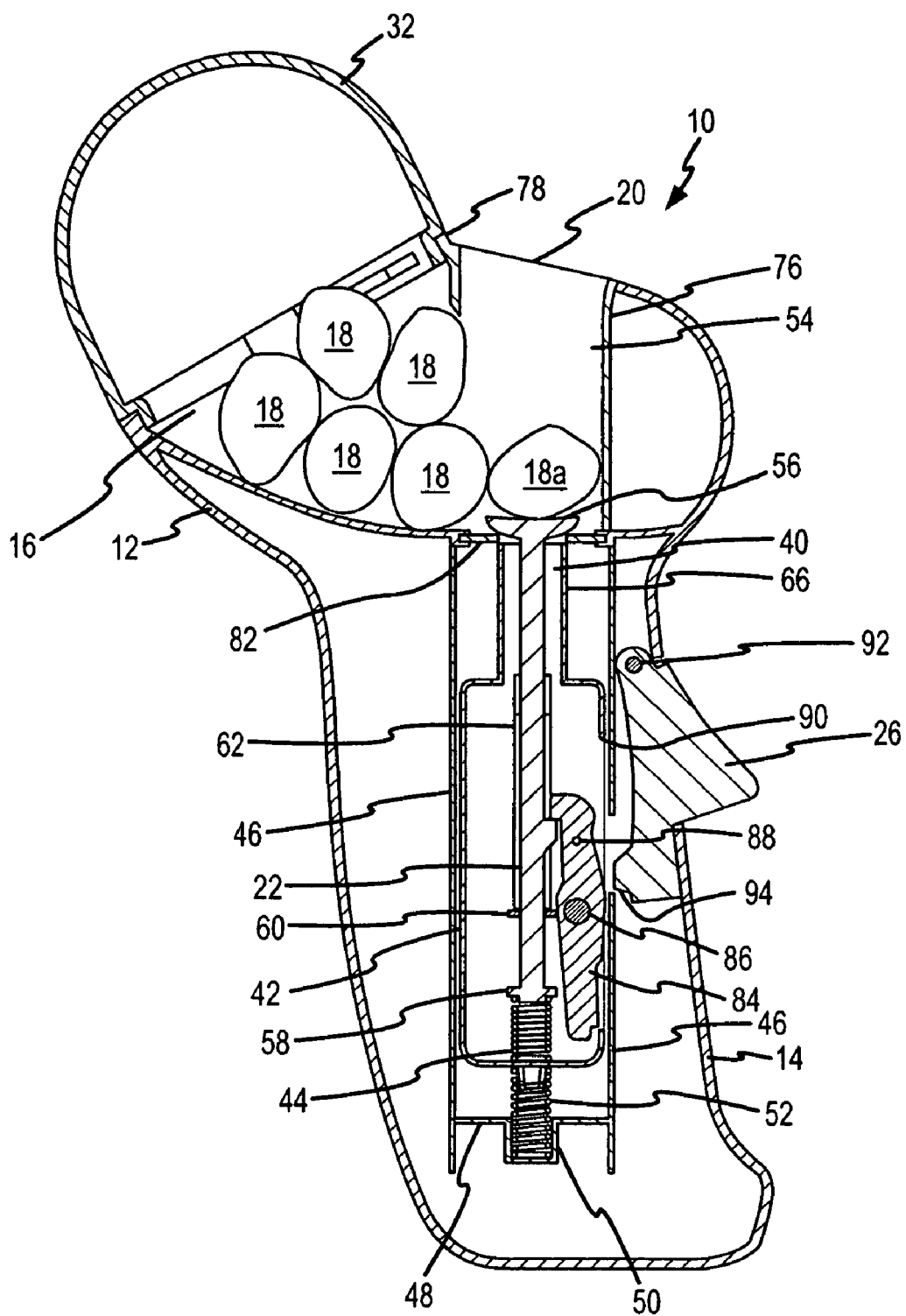
FIG. 7 is a cross-sectional view of the animal treat launcher of FIG. 1, taken along line 7-7 of FIG. 4.

The dispenser 10 can be adjusted from the unloaded uncocked configuration of FIG. 6 to the loading configuration of FIG. 7 by depressing cocking lever 22 downward to the position shown in FIG. 4. Ideally, the cocking lever 22 will be located ergonomically such that it can be depressed by a user's thumb, while the user's forefinger and middle finger remain on the trigger 26. The loading configuration of FIG. 7 shows that as the cocking lever 22 is depressed, the plunger 40 is corresponding moved downwardly. The plunger 40 in turn compresses plunger spring 44, which presses against the carriage 42. The carriage 42 in turn moves downwardly against the biasing force of the carriage spring 52. Upon initial movement of the cocking lever 22 towards the loading position of FIG. 7, both the plunger spring 44 and the carriage spring 52 compress, so that there is relative movement of the plunger 40 relative to the carriage 42 and relative movement of the carriage 42 relative to the body 12. Eventually, the cocking lever 22 reaches the full extent of its travel within cocking lever slot 62 formed in the carriage 42 and continued movement of the cocking lever 22 produces only movement of the carriage 42 relative to the body 12. The stiffness of the plunger spring 44 may be selected to be less than the stiffness of the carriage spring 52 in order to cause the plunger spring 44 to compress before the carriage spring 52 in order to cause relative movement of the plunger 40 with respect to the carriage 42 before the carriage 42 moves significantly relative to the body 12.

As the morsel support 56 of the plunger 40 and the top tube 66 of the carriage 42 move downward together to the loading position of FIG. 7 a single morsel of food 18a will be fed by gravity onto the morsel support 56. The launching tube 76 and inlet 80 into the launching tube are sized and shaped such that additional morsels of food 18 are prevented from entering the launching chamber 54. The first morsel 18a resting on the morsel support 56 will interfere with and prevent additional morsels 18 from entering the launching chamber 54. In the loading position of FIG. 7, both the plunger spring 44 and the carriage spring 52 are fully compressed. It should be appreciated that the catch 70 on the plunger 40 has now crossed over and is located below the locking surface 87 on top portion of the toggle lever 84. The tapered surface 72 of the catch 70 helps it ride over and not get snagged on the locking surface 87 as the plunger 40 moves downward to the loading position.

Figure 8:
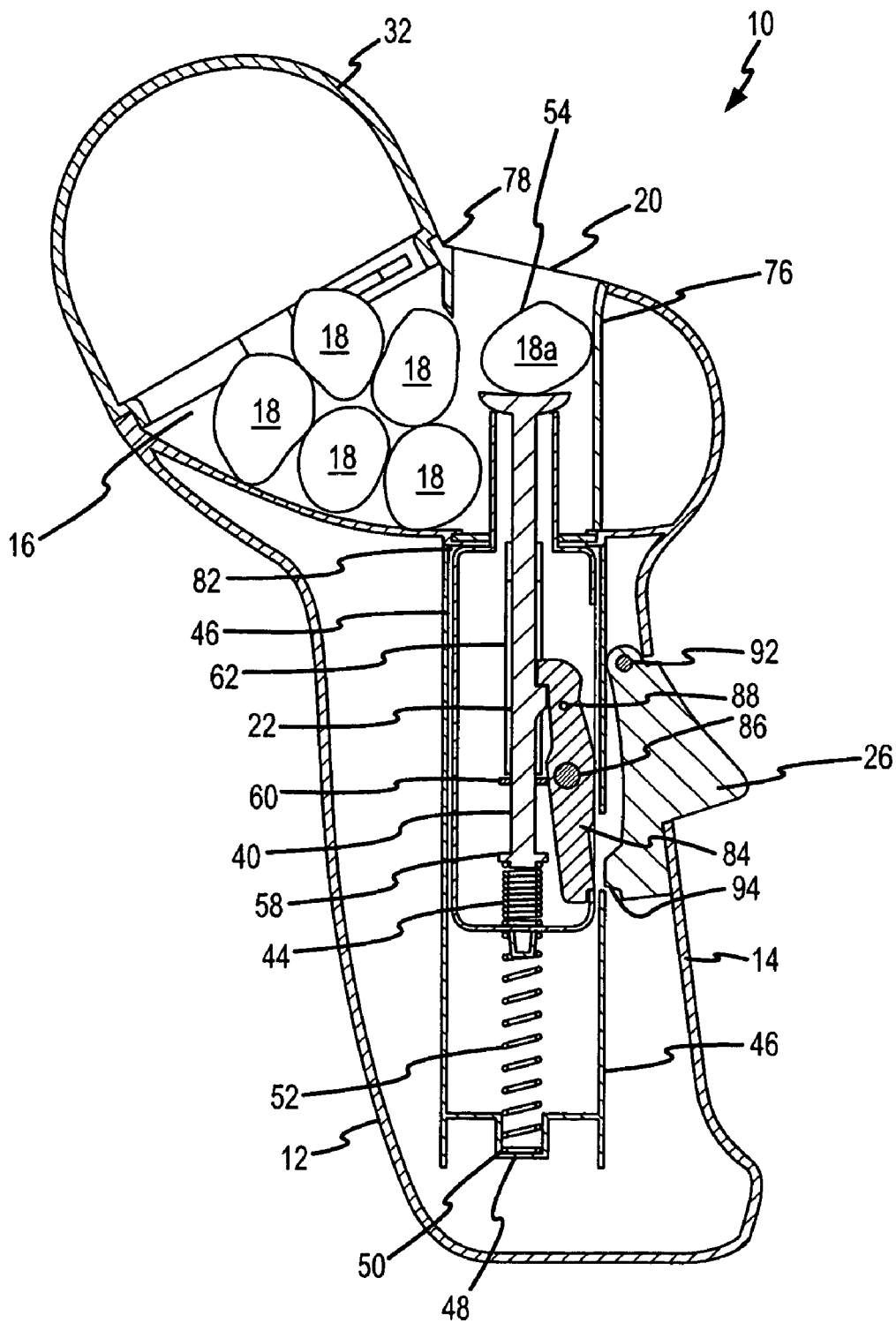
FIG. 8 is a cross-sectional view of the animal treat launcher of FIG. 1, taken along line 8-8 of FIG. 4.

Once the first food morsel 18a seated on the morsel support 56, the cocking lever 22 can be released, and the carriage spring 52 will urge the carriage 42 to the ready position of FIG. 8. As can be seen in FIG. 8, the catching surface 74 of the catch 70 on plunger 40 is caught by locking surface 87 on the upper portion of toggle lever 84. Accordingly, the plunger spring 44 remains fully compressed. The carriage 42 is returned to the same, or nearly the same position, as the unloaded uncocked position of FIG. 6. However, the plunger 40 is withdrawn fully into the carriage 42, and is prevented from upward movement relative to the carriage 42 by the interference between the catching surface 74 on the plunger 40 and the locking surface 87 of the toggle lever 84.

The projection 94 on the bottom of the trigger 26 is in alignment with and in close proximity to the bottom portion of the toggle lever 84. Accordingly, squeezing or depressing trigger 26 will cause the projection 94 to press against and move the bottom portion of the toggle lever 84 inward and correspondingly cause the upper portion of the toggle lever 84, including the locking surface 87 to move outward away from the plunger 40 until the locking surface 87 is clear from the catching surface 74 as shown in FIG. 9.

Figure 9:
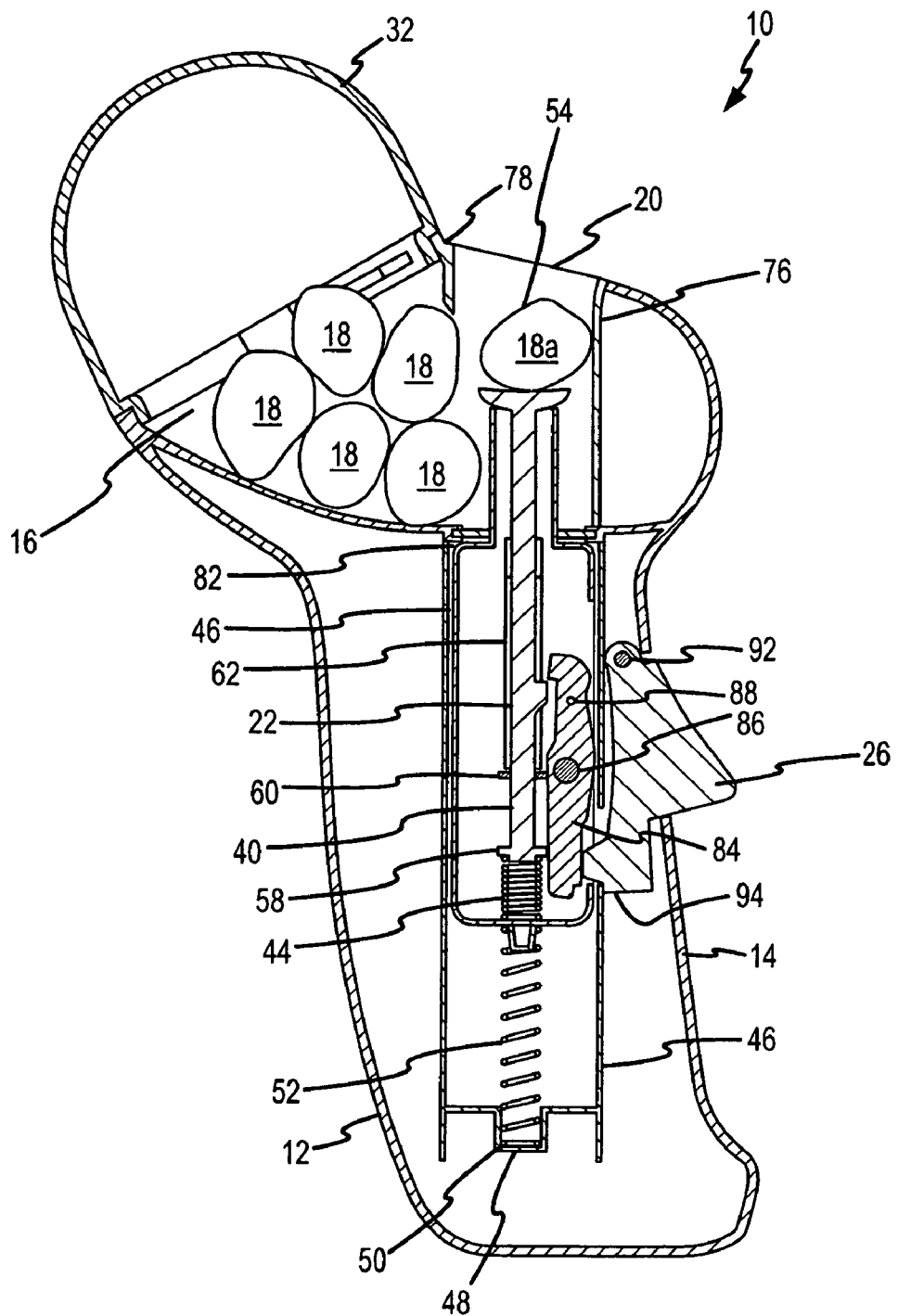
FIG. 9 is a cross-sectional view of the animal treat launcher of FIG. 1, taken along line 8-8 of FIG. 4 with the trigger moved to an activated position.

Once the catch 70 is clear from the locking surface 74 as shown in FIG. 9, the plunger 40 is no longer constrained from upward movement relative to the carriage 42, and the plunger spring 44 will urge plunger 40 upward back to the position of FIG. 6. The morsel of food 18a will be propelled upward by the upward movement of the morsel support 56 and will be launched upwardly and out through the outlet 20 by its own momentum when the plunger 40 is stopped by catches 60.

Accordingly, a user 100 may use the above described embodiment of a dispenser 10 to propel a morsel of animal feed 18 to a pet or other animal. The hopper 16 is first loaded with the desired treats. The hopper lid 32 is then placed on the body to retain the morsels 18 within the dispenser 10. The user 100 can then depress the cocking lever 22 fully to the position of FIG. 7 in order to load a morsel of food 18 on to the morsel support 56. Because of the shape and size of the launching chamber 54 as formed by the launch tube 76 including inlet 80, only a single morsel 18a will be loaded onto the morsel support. The user 100 can verify that a morsel 18 is loaded on the morsel support 56 by looking through the outlet 20. The user 100 may release the cocking lever 22 and the dispenser will self adjust into the cocked ready position of FIG. 8. When the user 100 is ready to launch the morsel 18, the user simply squeezes trigger 26 to the configuration of FIG. 9, and the morsel 18 will be launched out the outlet 20 to a waiting pet. The process may be repeated if desired. The user 100 can monitor the remaining supply of treats in the hopper 16 by visual inspection through the transparent hopper lid 32.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

I claim:

1. An animal food dispenser comprising:
   a body including: a grip portion, a hopper for retaining morsels of animal food, and a launching chamber, the launching chamber having an inlet for receiving one of the morsels of animal food from the hopper by gravity feed and an outlet for permitting the one morsel of animal food to pass out of the body;
   a propelling mechanism within the body for launching the one morsel of animal food out of the outlet, wherein the propelling mechanism comprises a plunger and a spring;
   a trigger mechanism associated with the grip portion for selectively activating the propelling mechanism; and
   a carriage slidably provided within the body, wherein the plunger is slidably received within the carriage, and further wherein the carriage is urged towards the launching chamber by a carriage biasing element provided between the carriage and the body and the plunger is urged towards the launching chamber by said spring provided between the carriage and the plunger.

2. The animal food dispenser of claim 1, wherein the plunger is adjustable between a loading position and a ready position, and wherein:
   when the plunger is in the loading position a top portion of the plunger is substantially withdrawn from the launching chamber to permit the one morsel of animal food to pass through the inlet into the launching chamber; and
   when the plunger is in the ready position the plunger supports the one morsel of animal food within the launching chamber and extends at least partially into the launching chamber to prevent additional morsels of food from passing through the inlet into the launching chamber.

3. The animal food dispenser of claim 1, wherein the trigger mechanism comprises a toggle lever pivotally mounted on the carriage, the toggle lever including a locking surface for engaging a catching surface on the plunger to maintain the plunger in the ready position, and wherein the trigger mechanism further comprises a trigger member for disengaging the locking surface from the catching surface to selectively activate the propelling mechanism.

4. An animal treat launcher for launching a morsel of food to a pet, the treat launcher comprising:
   a body having a hopper for retaining morsels of food; a biased plunger slidably mounted within the body having a loading position wherein the plunger is withdrawn away from the hopper to permit loading of a first morsel of food onto the plunger, the biased plunger having a ready position wherein the biased plunger is moved a distance from the loading position to partially block additional morsels of food from exiting the hopper;
   a trigger mechanism for activating the biased plunger away from the ready position and thereby launch the first morsel of food out of the body; and
   a carriage slidably provided within the body, wherein the plunger is slidably received within the carriage, and further wherein the carriage is urged towards a launching chamber by a carriage biasing element provided between the carriage and the body and the plunger is urged towards the launching chamber by a plunger biasing element provided between the carriage and the plunger.

5. The animal treat launcher of claim 4, wherein when the plunger is in the loading position, gravity will feed the first morsel of food onto a morsel supporting portion of the plunger.

6. The animal treat launcher of claim 5, wherein the body further comprises a structure for preventing the morsels of food in the hopper from interfering with a launch path of the first morsel of food.

7. The animal treat launcher of claim 4, wherein the trigger mechanism comprises a toggle lever pivotally mounted on the carriage, the toggle lever including a locking surface for engaging a catching surface on the plunger to maintain the plunger in the ready position, and wherein the trigger mechanism further comprises a trigger member for disengaging the locking surface from the catching surface to selectively activate the biased plunger.

8. A method of dispensing morsels of food to an animal comprising:
   providing an animal food dispenser comprising:
      a body including: a grip portion, a hopper for retaining morsels of animal food, and a launching chamber, the launching chamber; a propelling mechanism within the body for launching the one morsel of animal food, wherein the propelling mechanism comprises a plunger and a spring;
      a trigger mechanism associated with the grip portion for selectively activating the propelling mechanism; and
      a carriage slidably provided within the body, wherein the plunger is slidably received within the carriage, and further wherein the carriage is movable towards the launching chamber by a carriage biasing element provided between the carriage and the body and the plunger is movable towards the launching chamber by said spring provided between the carriage and the plunger;
   adjusting the propelling mechanism to a loading position, wherein a single morsel of animal food is loaded onto the propelling mechanism from the hopper;
   allowing the propelling mechanism to self-adjust from the loading position to a ready position; and
   disengaging the propelling mechanism from the ready position to launch the single morsel of animal food out of the animal food dispenser.

9. The method of dispensing morsels of animal food of claim 8, wherein said launching chamber having an inlet for receiving one of the morsels of animal food from the hopper by gravity feed and an outlet for permitting the one morsel of animal food to pass out of the animal food dispenser.

10. The method of dispensing morsels of animal food according to claim 8, further comprising a trigger mechanism including a toggle lever pivotally mounted on the carriage, the toggle lever including a locking surface for engaging a catching surface on the plunger to maintain the plunger in the ready position, and wherein the trigger mechanism further comprises a trigger member for disengaging the locking surface from the catching surface to perform the step of disengaging the propelling mechanism from the ready position.

* * * * *